(12) United States Patent
Takada

(10) Patent No.: US 10,914,213 B2
(45) Date of Patent: Feb. 9, 2021

(54) CONTROL DEVICE FOR INTERNAL COMBUSTION ENGINE AND CONTROL METHOD FOR INTERNAL COMBUSTION ENGINE

(71) Applicant: TOYOTA JIDOSHA KABUSHIKI KAISHA, Toyota (JP)

(72) Inventor: Keishi Takada, Ashigarakami-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/507,153

(22) Filed: Jul. 10, 2019

(65) Prior Publication Data

US 2020/0063623 A1 Feb. 27, 2020

(30) Foreign Application Priority Data

Aug. 22, 2018 (JP) ................................. 2018-155358

(51) Int. Cl.
| | |
|---|---|
| *F01N 3/20* | (2006.01) |
| *F01N 9/00* | (2006.01) |
| *F02D 41/02* | (2006.01) |
| *F02D 41/14* | (2006.01) |
| *B01D 53/94* | (2006.01) |

(52) U.S. Cl.
CPC ......... *F01N 3/202* (2013.01); *B01D 53/9495* (2013.01); *F01N 9/00* (2013.01); *F02D 41/024* (2013.01); *F02D 41/025* (2013.01); *F01N 2430/06* (2013.01); *F01N 2900/1404* (2013.01); *F02D 41/1475* (2013.01)

(58) Field of Classification Search
CPC .......... F01N 3/101; F01N 3/103; F01N 3/106; F01N 3/202; F01N 9/00; F01N 2430/06; F01N 2900/1404; F02D 41/024; F02D 41/025; F02D 41/1475
See application file for complete search history.

(56) References Cited

U.S. PATENT DOCUMENTS

| | | | | |
|---|---|---|---|---|
| 5,359,228 | A | * 10/1994 | Yoshida | .................. B60K 6/46 290/17 |
| 2015/0064073 | A1* | 3/2015 | Ikeda | ..................... H05B 6/802 422/173 |
| 2016/0363022 | A1* | 12/2016 | Hoki | ....................... F01N 3/035 |

(Continued)

FOREIGN PATENT DOCUMENTS

JP 2017-141803 A 8/2017

*Primary Examiner* — Audrey K Bradley
(74) *Attorney, Agent, or Firm* — Oliff PLC

(57) ABSTRACT

An internal combustion engine is provided with an engine body, a catalyst device provided in an exhaust passage of the engine body and having an exhaust purification catalyst with at least an oxidation function and a microwave absorber contained in a catalyst coat layer formed inside a substrate, and a microwave emitter for irradiating the catalyst device with microwaves. A control device for the internal combustion engine is configured so that if engine startup is requested when a temperature of the exhaust purification catalyst is less than a predetermined temperature, it makes the microwave emitter irradiate the catalyst device with microwaves and operates the engine body so that an air-fuel ratio of exhaust discharged from the engine body becomes a predetermined lean air-fuel ratio leaner than a stoichiometric air-fuel ratio.

8 Claims, 11 Drawing Sheets

(56) References Cited

U.S. PATENT DOCUMENTS

2019/0010846 A1* 1/2019 Ikeda .................... B60W 20/00
2019/0120108 A1* 4/2019 Singh ...................... F01N 3/202
2019/0381455 A1* 12/2019 Ikeda ........................ F01N 3/24

* cited by examiner

CONTROL DEVICE FOR INTERNAL COMBUSTION ENGINE AND CONTROL METHOD FOR INTERNAL COMBUSTION ENGINE

FIELD

The present disclosure relates to a control device for an internal combustion engine and a control method for an internal combustion engine.

BACKGROUND

Japanese Unexamined Patent Publication No. 2017-141803 discloses an internal combustion engine configured to coat an end face of a substrate of a catalytic converter at an upstream side of exhaust with a microwave absorber to enable this microwave absorber to be irradiated with microwaves. Further, Japanese Unexamined Patent Publication No. 2017-141803 discloses a control device for an internal combustion engine performing control so as to irradiate the microwave absorber with microwaves before startup of the internal combustion engine so as to heat the end face of the substrate while starting up the internal combustion engine to run a small amount of air to an exhaust passage and to use air becoming high in temperature by heat exchange when passing the end face of the substrate so as to heat the substrate as a whole and make the exhaust purification function activate before startup of the internal combustion engine.

SUMMARY

However, the disclosure described in the above-mentioned Japanese Unexamined Patent Publication No. 2017-141803 irradiated the microwave absorber with microwaves to heat the end face of the substrate and used the air becoming high in temperature by heat exchange when passing the end face of the substrate to heat the substrate as a whole and thereby raise the temperature of the exhaust purification catalyst inside the substrate and activate the exhaust purification function. That is, to activate the exhaust purification function, it was necessary to make the temperature of the substrate as a whole rise to the activation temperature of the exhaust purification catalyst or more. The amount of heat energy for activating the exhaust purification function tended to become large. For this reason, there was the problem that the microwave irradiation time tended to become longer and the amount of electric power for driving the microwave emitter became greater.

The present disclosure was made focusing on such a problem and has as its object to reduce the exhaust emission while keeping down the amount of electric power for driving the microwave emitter.

To solve the above problem, an internal combustion engine according to one aspect of the present disclosure is provided with an engine body, a catalyst device provided in an exhaust passage of the engine body and having an exhaust purification catalyst with at least an oxidation function and a microwave absorber contained in a catalyst coat layer formed inside a substrate, and a microwave emitter for irradiating the catalyst device with microwaves. Further, a control device for controlling the internal combustion engine is configured so that if engine startup is requested when the temperature of the exhaust purification catalyst is less than a predetermined temperature, it has the microwave emitter irradiate the catalyst device with microwaves and operates the engine body so that an air-fuel ratio of exhaust discharged from the engine body becomes a predetermined lean air-fuel ratio leaner than the stoichiometric air-fuel ratio.

Further, according to another aspect of the present disclosure, there is provided a control method for an internal combustion engine. The internal combustion engine is provided with an engine body, a catalyst device provided in an exhaust passage of the engine body and having an exhaust purification catalyst with at least an oxidation function and a microwave absorber contained in a catalyst coat layer formed inside a substrate, and a microwave emitter for irradiating the catalyst device with microwaves. The control method makes the microwave emitter irradiate the catalyst device with microwaves and operates the engine body so that an air-fuel ratio of exhaust discharged from the engine body becomes, a predetermined lean air-fuel ratio leaner than a stoichiometric air-fuel ratio if an engine startup is requested when a temperature of the exhaust purification catalyst is less than a predetermined temperature.

According to these aspects of the present disclosure, it is possible to reduce the exhaust emission while keeping down the amount of electric power for driving the microwave emitter.

DESCRIPTION OF EMBODIMENTS

Figure 1:
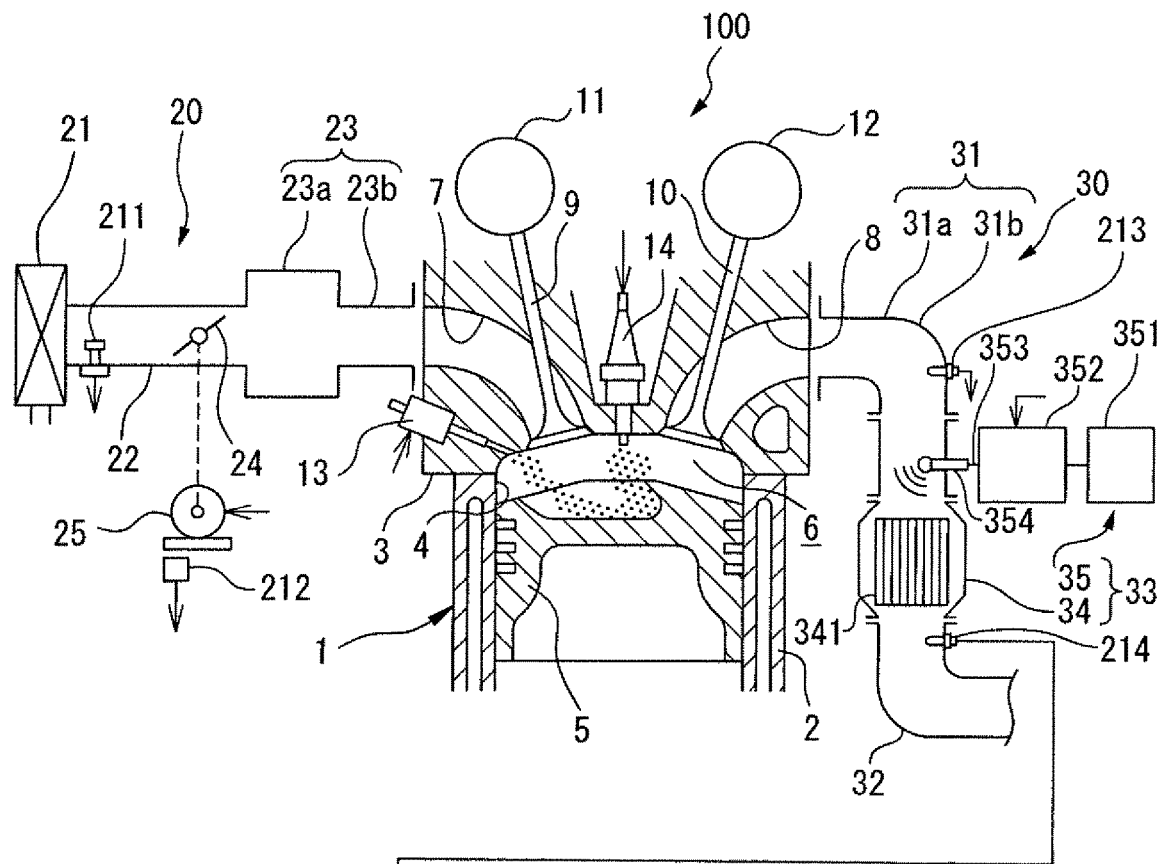
FIG. 1 is a schematic view of a configuration of an internal combustion engine and an electronic control unit for controlling the internal combustion engine according to a first embodiment of the present disclosure.

Below, referring to the drawings, embodiments of the present disclosure will be explained in detail. Note that, in the following explanation, similar component elements are assigned the same reference notations.

First Embodiment

FIG. 1 is a schematic view of a configuration of an internal combustion engine 100 and an electronic control unit 200 for controlling the internal combustion engine 100 according to a first embodiment of the present disclosure.

The internal combustion engine 100 is provided with an engine body 1, intake system 20, and exhaust system 30. The internal combustion engine 100, for example, is mounted in a vehicle and generates drive power for driving the vehicle.

The engine body 1 is provided with a cylinder block 2 and a cylinder head 3 fixed to a top surface of the cylinder block 2.

The cylinder block 2 is formed with a plurality of cylinders 4. Inside of each cylinder 4, a piston 5 which receives combustion pressure and reciprocates inside the cylinder 4 is held. The pistons 5 are connected through connecting rods (not shown) to a crankshaft (not shown). Due to the crankshaft, the reciprocating motions of the pistons 5 are converted to rotary motion. The spaces defined by the inside wall surface of the cylinder head 3, the inside wall surfaces of the cylinders 4, and the piston crowns form combustion chambers 6.

The cylinder head 3 is formed with intake ports 7 which open to one side of the cylinder head 3 and open to the combustion chambers 6 and exhaust ports 8 which open to the other side of cylinder head 3 and open to the combustion chambers 6.

Further, the cylinder head 3 has attached to it intake valves 9 for opening and closing the openings of the combustion chambers 6 and intake ports 7, exhaust valves 10 for opening and closing the openings of the combustion chambers 6 and exhaust ports 8, intake cam shafts 11 for driving operation of the intake valves 9, and exhaust cam shafts 12 for driving operation of the exhaust valves 10.

Still further, the cylinder head 3 has attached to it fuel injectors 13 for injecting fuel inside the combustion chambers 6 and spark plugs 14 for igniting the air-fuel mixture of the fuel injected from the fuel injectors 13 and the air inside the combustion chambers 6. In the present embodiment, as the fuel, gasoline having a stoichiometric air-fuel ratio of 14.6 is used, but other fuel may also be used. Note that, the fuel injectors 13 may also be attached so as to inject fuel inside the intake ports 7.

The intake system 20 is a system for guiding air through the intake ports 7 to the insides of the cylinders 4 and is provided with an air cleaner 21, intake pipe 22, intake manifold 23, electronic control type throttle valve 24, and air flow meter 211.

The air cleaner 21 removes sand and other foreign matter contained in the air.

The intake pipe 22 is connected at one end to the air cleaner 21 and is connected at the other end with a surge tank 23a of the intake manifold 23. Due to the intake pipe 22, air flowing through the air cleaner 21 to the inside of the intake pipe 22 (intake) is guided to the surge tank 23a of the intake manifold 23.

The intake manifold 23 is provided with the surge tank 23a and a plurality of intake runners 23b branched from the surge tank 23a and connected to the openings of the intake ports 7 formed at the side surface of the cylinder head. The air guided to the surge tank 23a is evenly distributed through the intake runners 23b to the insides of the cylinders 4. In this way, the intake pipe 22, the intake manifold 23, and intake ports 7 form intake passages for guiding air to the insides of the cylinders 4.

The throttle valve 24 is provided inside the intake pipe 22. The throttle valve 24 is driven by a throttle actuator 25 and changes the passage cross-sectional area of the intake pipe 22 continuously or in stages. By using the throttle actuator 25 to adjust the opening degree of the throttle valve 24 (below, referred to as the "throttle opening degree"), the amounts of intake sucked into the cylinders 4 are adjusted. The throttle opening degree is detected by a throttle sensor 212.

The air flow meter 211 is provided inside of the intake pipe 22 at the upstream side from the throttle valve 24. The air flow meter 211 detects the amount of flow of air flowing through the inside of the intake pipe 22 (below, referred to as the "intake amount").

The exhaust system 30 is a system for purifying the combustion gas (exhaust gas) generated inside the combustion chambers 6 and discharging it to the outside air and is provided with an exhaust manifold 31, exhaust pipe 32, exhaust after treatment system 33, air-fuel ratio sensor 213, and exhaust temperature sensor 214.

The exhaust manifold 31 is provided with a plurality of exhaust runners 31a connected to openings of exhaust ports 8 formed at the side surface of the cylinder head and a header pipe 31b gathering the exhaust runners 31a and combining them into one.

The exhaust pipe 32 is connected at one end to the header pipe 31b of the exhaust manifold 31 and opens at the other end to the outside air. The exhaust discharged from the cylinders 4 through the exhaust ports 8 to the exhaust manifold 31 flows through the exhaust pipe 32 and is discharged to the outside air.

The exhaust after treatment system 33 is provided with a catalytic converter 34 and a microwave emitter 35.

The catalytic converter 34 is comprised of a substrate 341 having a plurality of passages running along a direction of flow of exhaust and a catalyst coat layer 342 (see FIG. 2A to FIG. 2C) formed on the surface of the same and is provided in the exhaust pipe 32. The catalyst coat layer 342 includes as an exhaust purification catalyst having at least an oxidation function (oxidation catalyst, three-way catalyst, etc.) a carrier of alumina ($Al_2O_3$) etc. and a precious metal carried on that carrier such as platinum (Pt) or palladium (Pd), rhodium (Rh), etc. and a microwave absorber such as silicon carbide particles (SiC particles) absorbing microwaves and generating heat.

By activating the exhaust purification function, if using an exhaust purification catalyst constituted as an oxidation catalyst, the harmful substances in the exhaust such as the hydrocarbons (HC) and carbon monoxide (CO) can be removed by oxidizing them. Further, if using an exhaust purification catalyst constituted as a three-way catalyst, in addition to these unburned gases (HC and CO), it is possible to reduce the nitrogen oxides ($NO_x$) to nitrogen ($N_2$) for removal.

Figure 2A:
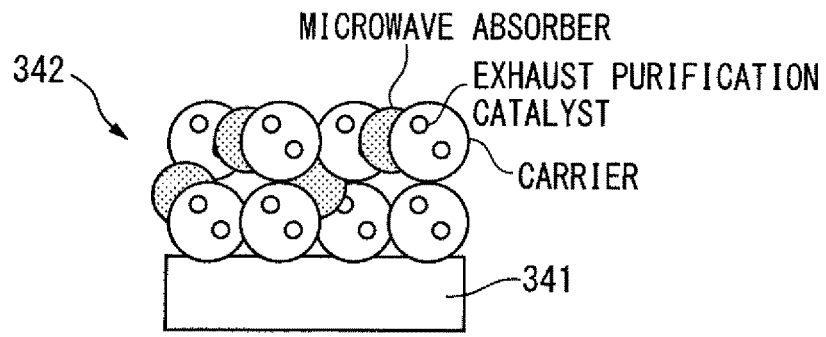
FIG. 2A is a view showing one example of the configuration of a catalyst coat layer.
Figure 2B:
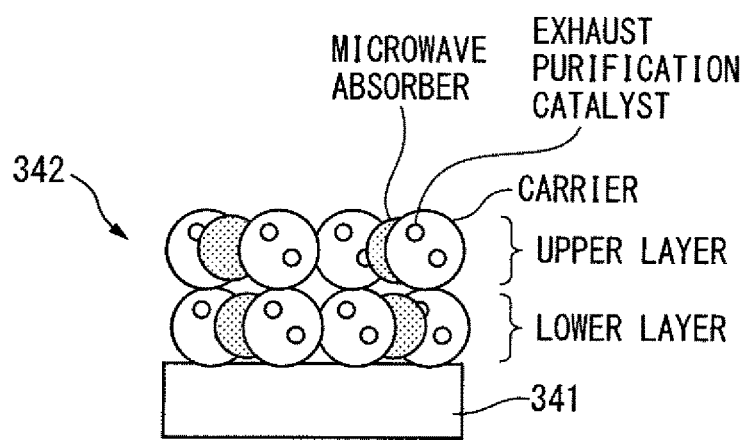
FIG. 2B is a view showing one example of the configuration of a catalyst coat layer.

The catalyst coat layer 342, for example, as shown in FIG. 2A, may be made a single layer structure of just a single catalyst coat layer 342 formed on the surface of the substrate 341 or, as shown in FIG. 2B, may be a multilayer structure of a plurality of catalyst coat layers 342 formed on the surface of the substrate 341. Note that, in the example of FIG. 2B, a two-layer structure of an upper layer and a lower layer is shown. Further, in the case of a multilayer structure, as shown in FIG. 2C, it is also possible to have only the catalyst coat layer 342 desired to be raised in temperature to be activated by the heat generating action of the microwave absorber (in the example of FIG. 2C, the upper catalyst coat layer), that is, the catalyst coat layer 342 in which the exhaust purification catalyst particularly desired to be activated is present, contain the microwave absorber.

Figure 2C:
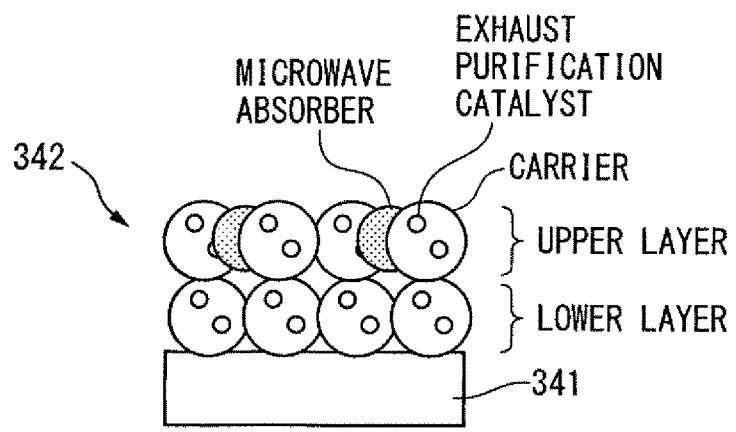
FIG. 2C is a view showing one example of the configuration of a catalyst coat layer.

In the present embodiment, as shown in FIG. 2C, the catalyst coat layer 342 is made a two-layer structure and the top layer catalyst coat layer is made to contain the microwave absorber. Further, in the present embodiment, the region of the substrate 341 at the upstream side in the direction of flow of exhaust is made to contain the microwave absorber.

Returning to FIG. 1, the microwave emitter 35 is provided with a microwave power source 351, microwave generator 352, transmission cable 353, and microwave emission antenna 354.

The microwave power source 351 is electrically connected to the microwave generator 352 and supplies the electric power necessary for the microwave generator 352 to generate microwaves to the microwave generator 352. The microwave power source 351 may be a dedicated power source. Further, if the internal combustion engine 100 is mounted in a vehicle, it may be the battery of the vehicle.

The microwave generator 352 is driven by the electric power of the microwave power source 351 and generates microwaves of a predetermined frequency.

The transmission cable 353 is a cable for transmitting the microwaves generated by the microwave generator 352 to the microwave emission antenna 354. One end is connected to the microwave generator, while the other end is connected to the microwave emission antenna 354.

The microwave emission antenna 354 is placed inside of the exhaust pipe 32 positioned at the upstream side in the direction of flow of exhaust from the catalytic converter 34. The microwave emission antenna 354 first irradiates the catalytic converter 34 with the microwaves transmitted through the transmission cable 353. Due to this, the microwave absorber contained in the catalyst coat layer 342 of the catalytic converter 34 can be made to generate heat and the exhaust purification catalyst contained in the catalyst coat layer 342 can be directly heated, so, for example, compared with heating the substrate 341, it is possible to efficiently activate the exhaust purification function.

The air-fuel ratio sensor 213 is provided at the header pipe 31b of the exhaust manifold 31 and detects the air-fuel ratio of the exhaust flowing into the first catalytic converter 34 (below, referred to as the "exhaust air-fuel ratio").

The exhaust temperature sensor 214 is provided at the exhaust pipe at the downstream side from the catalytic converter 34 and detects the temperature Tex of the exhaust flowing out from the catalytic converter 34 (below, referred to as the "exhaust temperature").

The electronic control unit 200 is comprised of a digital computer and is provided with components connected to each other by a bidirectional bus 201 such as a ROM (read only memory) 202, RAM (random access memory) 203, CPU (microprocessor) 204, input port 205, and output port 206.

The input port 205 receives as input not only the output signals of the above-mentioned air flow meter 211 etc. but also an output signal of an outside air temperature sensor 215 for detecting an outside air temperature To through the corresponding AD converters 207. Further, the input port 205 receives as input, as a signal for detecting the engine load, the output voltage of a load sensor 217 generating an output voltage proportional to the amount of depression of an accelerator pedal 220 (below, referred to as the "amount of accelerator depression") through a corresponding AD converter 207. Further, the input port 205 receives as input, as a signal for calculating the engine rotational speed etc., an output signal of a crank angle sensor 218 generating an output pulse every time a crankshaft of the engine body 1 rotates by for example 15°. In this way, the input port 205 receives as input the output signals of the various sensors required for control of the internal combustion engine 100.

The output port 206 is connected through the corresponding drive circuits 208 to the fuel injectors 13 and other controlled parts.

The electronic control unit 200 outputs control signals for controlling the various controlled parts to control the internal combustion engine 100 based on the output signals of the various sensors input to the input port 205.

The electronic control unit 200 controls the internal combustion engine 100 so that the exhaust air-fuel ratio detected by the air-fuel ratio sensor 213 becomes the target exhaust air-fuel ratio. Specifically, the electronic control unit 200 controls by feedback the amounts of fuel injection from the fuel injectors 13 based on the exhaust air-fuel ratio so that the exhaust air-fuel ratio becomes the target exhaust air-fuel ratio.

Further, the electronic control unit 200 performs catalyst warmup control for warming up the catalytic converter 33 when cold starting the internal combustion engine or otherwise when it is necessary to activate the exhaust purification function of the catalytic converter 34.

Here, as shown in the present embodiment, when providing the microwave emitter 35, it is possible to drive the microwave emitter 35 to irradiate the catalytic converter 34 with microwaves from the microwave emission antenna 354 to make the microwave absorber contained in the catalyst coat layer 342 generate heat and directly heat the exhaust purification catalyst contained in the catalyst coat layer 342 to activate it early. By activating the exhaust purification function early, it is possible to reduce the exhaust emission.

On the other hand, when driving the microwave emitter 35, electric power is consumed. The electric power used for driving the microwave emitter 35 basically becomes electric power generated utilizing the power of the internal combustion engine 100. Therefore, to keep the fuel efficiency from deteriorating, it is desirable to shorten the driving time of the microwave emitter 35 as much as possible to keep down the amount of power consumption by the microwave emitter 35 while controlling warmup so that the exhaust purification action by the exhaust purification catalyst is obtained early.

Therefore, the inventors engaged in intensive studies and as a result learned that by controlling the exhaust air-fuel ratio to a lean air-fuel ratio leaner than the stoichiometric air-fuel ratio to operate the internal combustion engine 100 while driving the microwave emitter 35, it is possible to keep down the amount of power consumption of the microwave emitter 35 while obtaining the exhaust purification action by the exhaust purification catalyst early.

Figure 3:
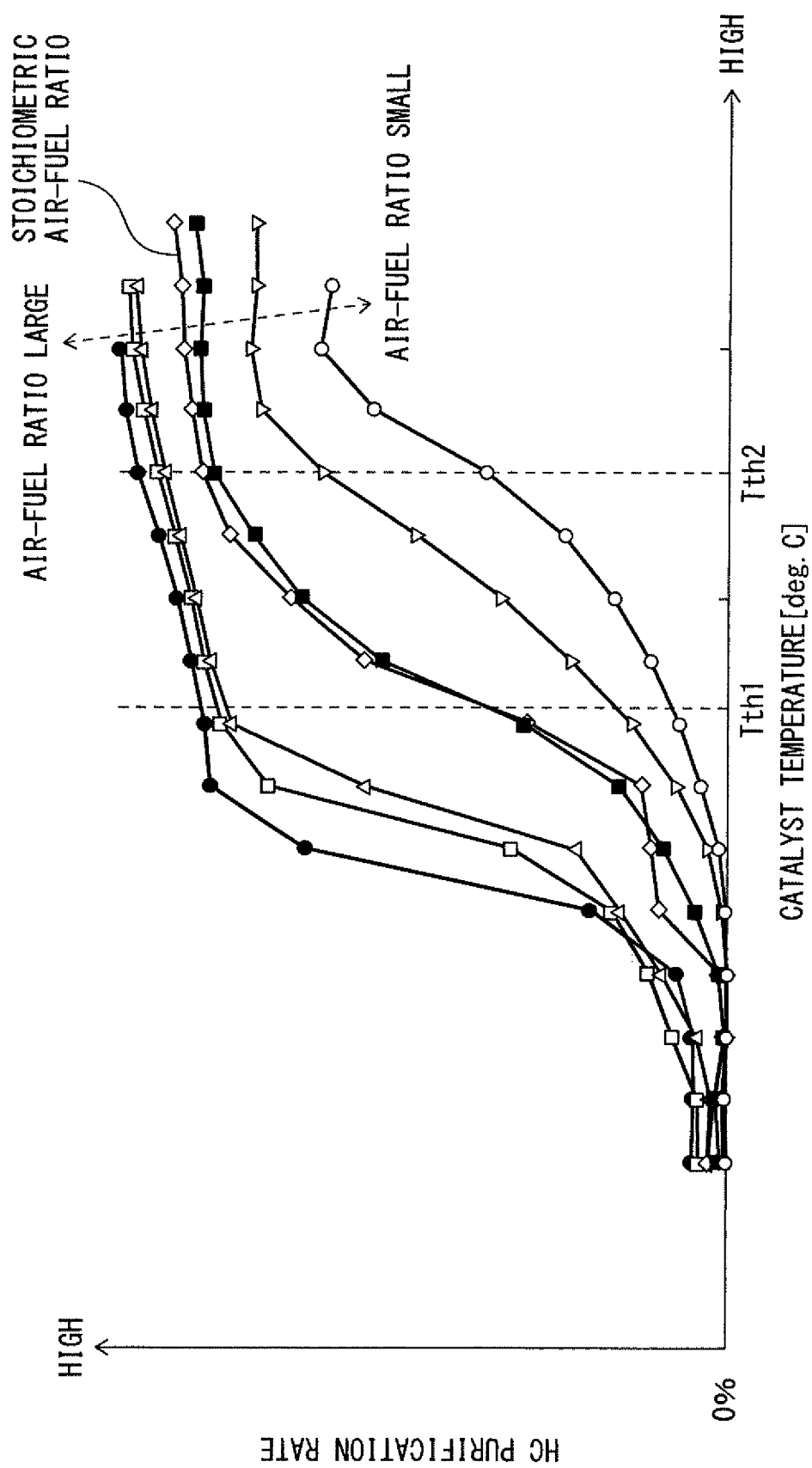
FIG. 3 is a view showing a relationship between a catalyst temperature and HC purification rate for every air-fuel ratio of exhaust gas flowing into a catalytic converter.

FIG. 3 is a view showing the relationship between the temperature of the exhaust purification catalyst inside the catalytic converter 34 (below, referred to as the "catalyst temperature") and the purification rate of hydrocarbons in the exhaust inside the catalytic converter 34 (below, referred to as the "HC purification rate") for each air-fuel ratio of exhaust flowing into the catalytic converter 34.

As shown in FIG. 3, the catalyst temperature at which the HC purification rate becomes a predetermined purification rate changes in accordance with the exhaust air-fuel ratio. Specifically, compared to when controlling the exhaust air-fuel ratio to the stoichiometric air-fuel ratio to operate the internal combustion engine 100, when controlling the exhaust air-fuel ratio to a lean air-fuel ratio leaner than the stoichiometric air-fuel ratio to operate the internal combustion engine 100, the catalyst temperature at which the HC purification rate becomes the predetermined purification rate becomes lower, while conversely when controlling the exhaust air-fuel ratio to a rich air-fuel ratio richer than the stoichiometric air-fuel ratio to operate the internal combustion engine 100, the catalyst temperature at which the HC purification rate becomes the predetermined purification rate becomes higher.

That is, by controlling the exhaust air-fuel ratio to the lean air-fuel ratio to operate the internal combustion engine 100, it is possible to lower the catalyst temperature at which purification (oxidation) of HC becomes possible. Therefore, even if driving the microwave emitter 35 to heat the exhaust purification catalyst until the HC purification rate becomes a predetermined purification rate, by controlling the exhaust air-fuel ratio to a lean air-fuel ratio to operate the internal combustion engine 100, it is possible to shorten the drive time of the microwave emitter 35 compared with when controlling the exhaust air-fuel ratio to the stoichiometric air-fuel ratio or a rich air-fuel ratio to operate the internal combustion engine 100.

Therefore, in the present embodiment, as shown in FIG. 3, if designating the catalyst temperature at which the HC purification rate becomes a predetermined purification rate (for example 80%) when controlling the exhaust air-fuel ratio to a predetermined lean air-fuel ratio to operate the internal combustion engine 100 as the "first catalyst temperature Tth1" and designating the catalyst temperature at which the HC purification rate becomes a predetermined purification rate (for example 80%) when controlling the exhaust air-fuel ratio to the stoichiometric air-fuel ratio to operate the internal combustion engine 100 as the "second catalyst temperature Tth2", the microwave emitter 35 is driven while controlling the exhaust air-fuel ratio to the lean air-fuel ratio to operate the internal combustion engine 100 when the catalyst temperature is less than the first catalyst temperature Tth1.

Further, when the catalyst temperature becomes the first catalyst temperature Tth1 or more, the microwave emitter 35 is made to stop while the exhaust air-fuel ratio is still controlled to the lean air-fuel ratio to operate the internal combustion engine 100. This is because after the catalyst temperature becomes the first catalyst temperature Tth1, by controlling the exhaust air-fuel ratio to the lean air-fuel ratio to operate the internal combustion engine 100, it is possible to purify (oxidize) the HC by a predetermined purification rate or more, so it becomes possible to use the heat of reaction when purifying (oxidizing) the HC to make the catalyst temperature rise to the second catalyst temperature Tth2.

Further, after the catalyst temperature becomes the second catalyst temperature Tth2, even if controlling the exhaust air-fuel ratio to the stoichiometric air-fuel ratio to operate the internal combustion engine 100, it becomes possible to purify the HC by a predetermined purification rate or more, so basically the exhaust air-fuel ratio is controlled to the stoichiometric air-fuel ratio to operate the internal combustion engine 100.

Figure 4:
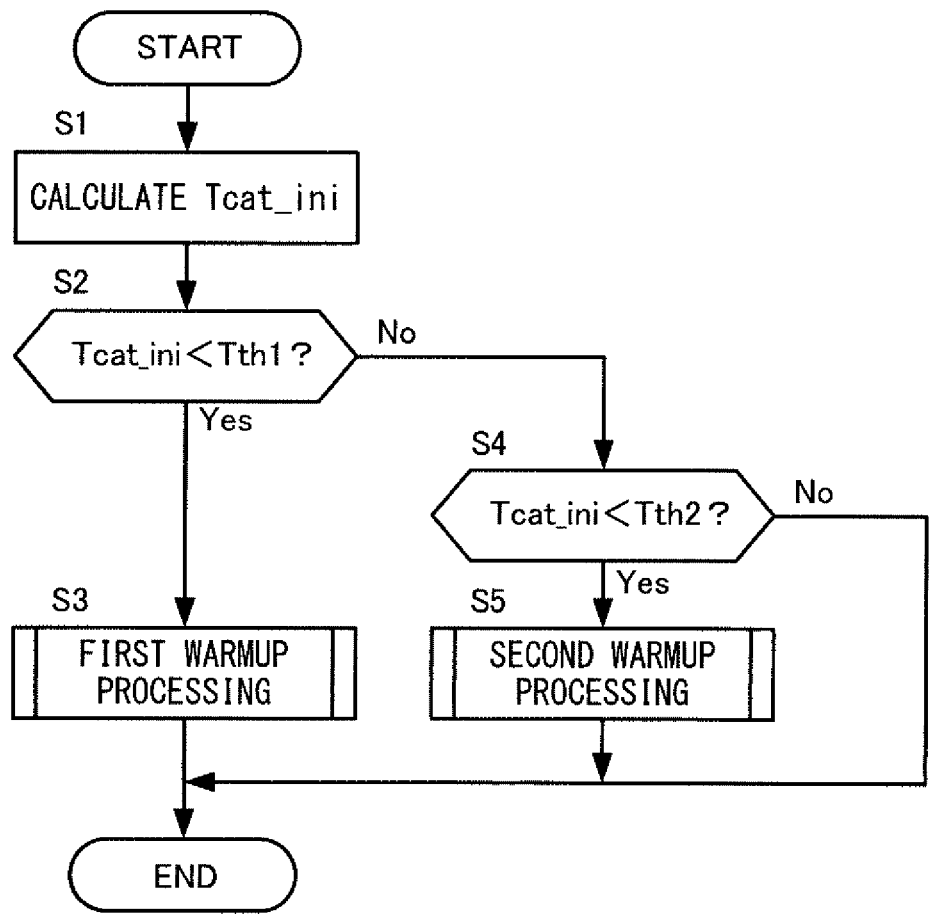
FIG. 4 is a flow chart explaining catalyst warmup control according to the first embodiment of the present disclosure.

FIG. 4 is a flow chart for explaining catalyst warmup control according to this embodiment.

At step S1, the electronic control unit 200 calculates the catalyst temperature Tcat_ini at the time of startup of the internal combustion engine 100 (below, referred to as the "initial catalyst temperature"). In the present embodiment, the electronic control unit 200 calculates the initial catalyst temperature Tcat_ini based on the catalyst temperature Tcats when stopping the internal combustion engine 100 the previous time (below, referred to as the "stopped catalyst temperature"), the time elapsed from when stopping the internal combustion engine 100 the previous time (below, referred to as the "engine stop time period"), and the outside air temperature To. The initial catalyst temperature Tcat_ini falls more from the stopped catalyst temperature Tcats toward the outside air temperature To the longer the engine stop time period.

At step S2, the electronic control unit 200 judges if the initial catalyst temperature Tcat_ini is less than the first catalyst temperature Tth1. If the initial catalyst temperature Tcat_ini is less than the first catalyst temperature Tth1, the electronic control unit 200 proceeds to the processing of step S3. On the other hand, if initial catalyst temperature Tcat_ini is the first catalyst temperature Tth1 or more, the electronic control unit 200 proceeds to the processing of step S4.

At step S3, the electronic control unit 200 performs first warmup processing. The first warmup processing is basically processing for warmup by performing control (lean control) using the microwave emitter 35 to emit microwaves while operating the internal combustion engine 100 so that the exhaust air-fuel ratio becomes a predetermined lean air-fuel ratio. The content of the first warmup processing will be explained later referring to FIG. 5.

At step S4, the electronic control unit 200 judges whether the initial catalyst temperature Tcat_ini is less than the second catalyst temperature Tth2. If the initial catalyst temperature Tcat_ini is less than the second catalyst temperature Tth2, the electronic control unit 200 proceeds to the processing of step S5. On the other hand, if the initial catalyst temperature Tcat_ini is the second catalyst temperature Tth2 or more, the electronic control unit 200 judges that catalyst warmup is unnecessary and ends the catalyst warmup control.

At step S5, the electronic control unit 200 performs second warmup processing. The second warmup processing is processing performing lean control for warmup without having the microwave emitter 35 emit microwaves. The content of the second warmup processing will be explained later with reference to FIG. 6.

Figure 5:
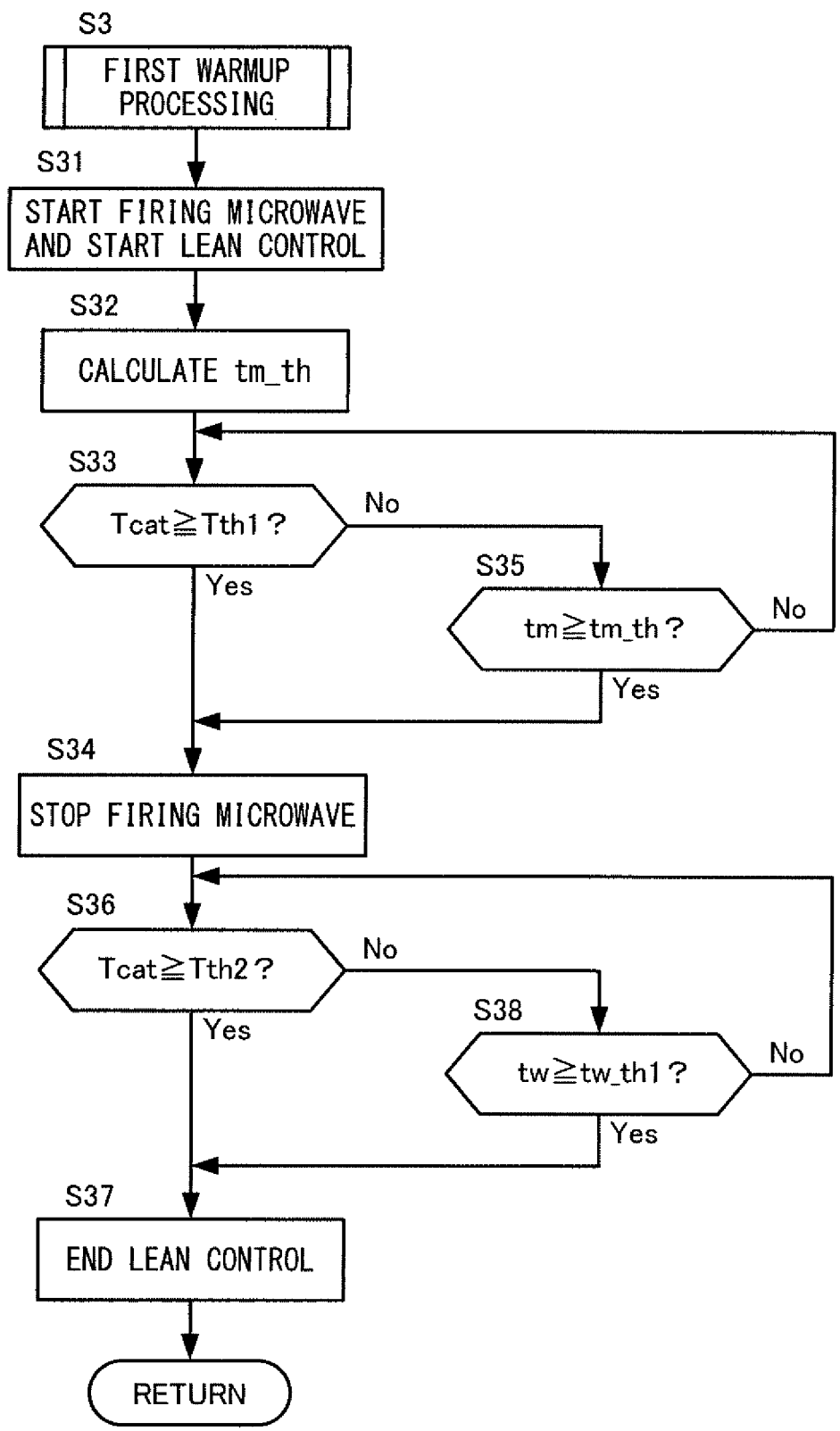
FIG. 5 is a flow chart explaining first warmup processing.

FIG. 5 is a flow chart for explaining first warmup processing.

At step S31, the electronic control unit 200 starts the microwave emitter 35 emitting microwaves, starts up the internal combustion engine 100, and performs lean control operating the internal combustion engine 100 so that the exhaust air-fuel ratio becomes a predetermined lean air-fuel ratio for the time of warmup control (for example 15 to 16 or so).

At step S32, the electronic control unit 200 refers to a table etc. prepared in advance by experiments etc. and calculates an upper limit value tm_th of the time for continuation of the microwave emitter 35 emitting microwaves (below, referred to as the "microwave maximum emission time") based on the initial catalyst temperature Tcat_ini. The microwave maximum emission time tm_th is the time after which it can be deemed that the catalyst temperature has reached the first catalyst temperature Tth1 when making the microwave emitter 35 emit microwaves while setting the target air-fuel ratio to the lean air-fuel ratio to operate the internal combustion engine 100. The microwave maximum emission time tm_th becomes shorter the higher the initial catalyst temperature Tcat_ini.

At step S33, the electronic control unit 200 reads the current value Tcat of the catalyst temperature calculated separately from the present routine (below, referred to as the "current catalyst temperature") and judges if the current catalyst temperature Tcat is the first catalyst temperature Tth1 or more. In the present embodiment, the electronic control unit 200 adds to the previous catalyst temperature value Tcatz the amount of change ΔTcat of the catalyst temperature per unit time so as to calculate the current catalyst temperature Tcat. Note that, the initial value of the previous catalyst temperature value Tcatz is made the initial catalyst temperature Tcat_ini. Further, the amount of change ΔTcat of the catalyst temperature can, for example, be calculated by calculating the balance of the amount of heat with respect to the catalytic converter 34 based on the previous catalyst temperature value Tcatz and the exhaust temperature Tex. If the current catalyst temperature Tcat is the first catalyst temperature Tth1 or more, the electronic control unit 200 proceeds to the processing of step S34. On the other hand, if the current catalyst temperature Tcat is less than the first catalyst temperature Tth1, the electronic control unit 200 proceeds to the processing of step S35.

At step S34, the electronic control unit 200 makes the microwave emitter 35 stop emitting the microwaves.

At step S35, the electronic control unit 200 judges if the time elapsed tm from when the microwave emitter 35 starts emitting the microwaves (below, referred to as the "microwave emission time") is the microwave maximum emission time tm_th or more. If the microwave emission time tm is the microwave maximum emission time tm_th or more, even if the current catalyst temperature Tcat is less than the first catalyst temperature Tth1, the electronic control unit 200 proceeds to the processing of step S34 and makes the microwave emitter 35 stop emitting the microwaves. This is because, for example, if a malfunction of the exhaust temperature sensor 214 causes the exhaust temperature Tex to be unable to be accurately detected any longer, sometimes the catalyst temperature can no longer be accurately calculated and the current catalyst temperature Tcat will not become the first catalyst temperature Tth1 or more. This considers such a case. Further, if the microwave emission time tm is less than the microwave maximum emission time tm_th, the electronic control unit 200 returns to the processing of step S33 after waiting for a certain time.

At step S36, the electronic control unit 200 reads in the current catalyst temperature Tcat and judges if the current catalyst temperature Tcat is the second catalyst temperature Tth2 or more. If the current catalyst temperature Tcat is the second catalyst temperature Tth2 or more, the electronic control unit 200 proceeds to the processing of step S37. On the other hand, if the current catalyst temperature Tcat is less than the second catalyst temperature Tth2, the electronic control unit 200 proceeds to the processing of step S38.

At step S37, the electronic control unit 200 ends the lean control, sets the target exhaust air-fuel ratio of the internal combustion engine 100 to the target exhaust air-fuel ratio for the times of normal operation (basically, the stoichiometric air-fuel ratio), and ends the first warmup processing.

At step S38, the electronic control unit 200 judges if the time of continuation tw of lean control from when making the microwave emitter 35 stop emitting the microwaves (below, referred to as the "lean control continuation time") has become a predetermined upper limit value tw_th1 (below, referred to as the "first lean control maximum continuation time") or more. The first lean control maximum continuation time tw_th1 is the time after which it can be deemed that the catalyst temperature has reached the second catalyst temperature Tth2 when performing lean control while not making the microwave emitter 35 emit the microwaves after raising the catalyst temperature to the first catalyst temperature Tth1. In the present embodiment, the first lean control maximum continuation time tw_th1 is made a predetermined value set in advance.

If the lean control continuation time tw is the first lean control maximum continuation time tw_th1 or more, even if the current catalyst temperature Tcat is less than the second catalyst temperature Tth2, the electronic control unit 200 proceeds to the processing of step S37 where it ends the lean control. Further, if the lean control continuation time tw is less than the first lean control maximum continuation time tw_th1, the electronic control unit 200 returns to the processing of step S36 after waiting for a certain time.

Figure 6:
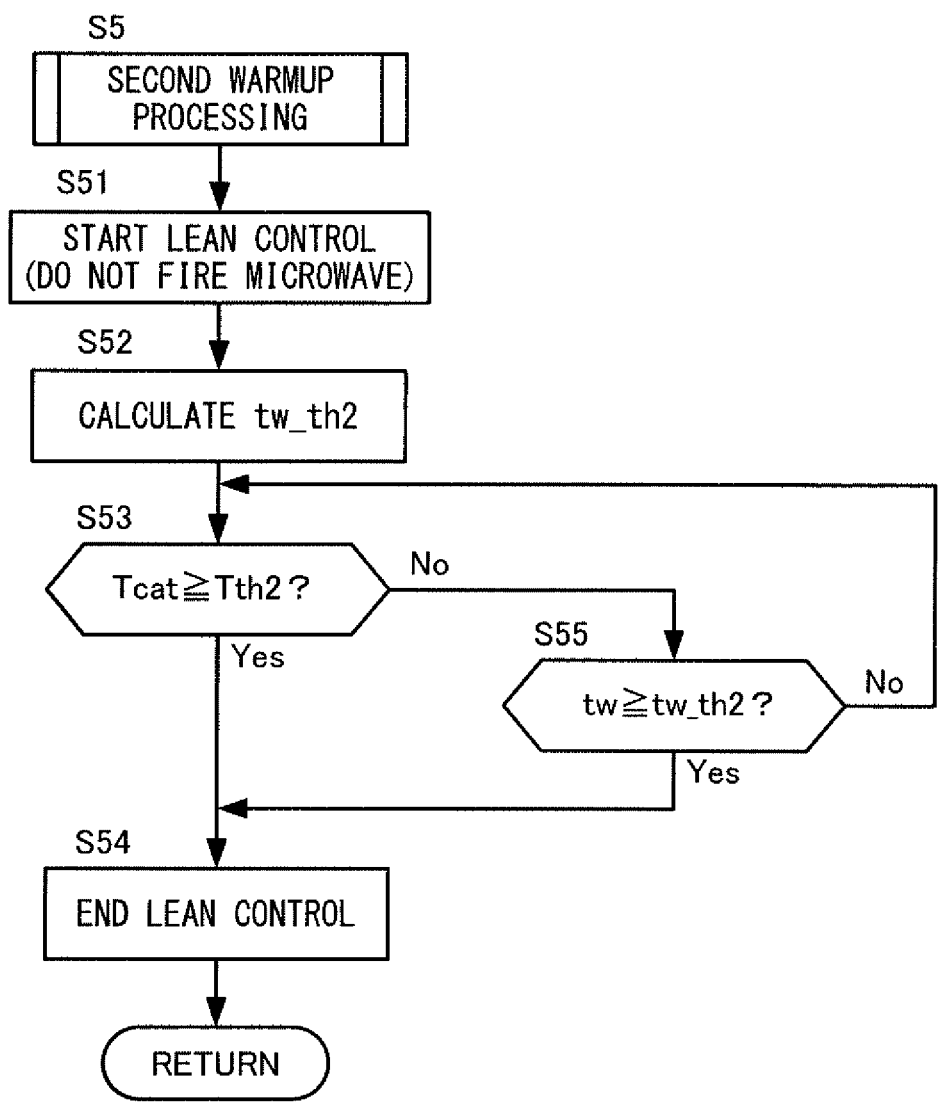
FIG. 6 is a flow chart explaining second warmup processing.

FIG. 6 is a flow chart for explaining the content of the second warmup processing.

At step S51, the electronic control unit 200 starts the internal combustion engine 100 without making the microwave emitter 35 emit the microwaves and starts lean control operating the internal combustion engine 100 so that the exhaust air-fuel ratio becomes a predetermined lean air-fuel ratio for times of warmup control (for example 15 to 16 or so).

At step S52, the electronic control unit 200 refers to a table etc. prepared in advance by experiments etc. and calculates the upper limit value tw_th2 of the time of continuation of lean control in the second warmup processing (below, referred to as the "second lean control maximum continuation time") based on the initial catalyst temperature Tcat_ini.

The second lean control maximum continuation time tw_th2 is the time after which it can be deemed that the catalyst temperature has reached the second catalyst temperature Tth2 from the state where the catalyst temperature is the initial catalyst temperature Tcat_ini when performing lean control without making the microwave emitter 35 emit the microwaves. The second lean control maximum continuation time tw_th2 becomes shorter the higher the initial catalyst temperature Tcat_ini.

At step S53, the electronic control unit 200 reads the current catalyst temperature Tcat and judges if the current catalyst temperature Tcat is the second catalyst temperature Tth2 or more. If the current catalyst temperature Tcat is the second catalyst temperature Tth2 or more, the electronic control unit 200 proceeds to the processing of step S54. On the other hand, if the current catalyst temperature Tcat is less than the second catalyst temperature Tth2, the electronic control unit 200 proceeds to the processing of step S55.

At step S54, the electronic control unit 200 ends the lean control and sets the target exhaust air-fuel ratio of the internal combustion engine 100 to the target exhaust air-fuel ratio for the times of normal operation (basically, the stoichiometric air-fuel ratio) and ends the second warmup processing.

At step S55, the electronic control unit 200 judges if the lean control continuation time tw from when starting the second warmup processing is the second lean control maximum continuation time tw_th2 or more. If the lean control continuation time tw is the second lean control maximum continuation time tw_th2 or more, even if the catalyst temperature Tcat is less than the second catalyst temperature Tth2, the electronic control unit 200 proceeds to the processing of step S54 and ends the lean control. Further, if the lean control continuation time tw is less than the second lean control maximum continuation time tw_th2, the electronic control unit 200 returns to the processing of step S53 after waiting for a certain time.

Figure 7:
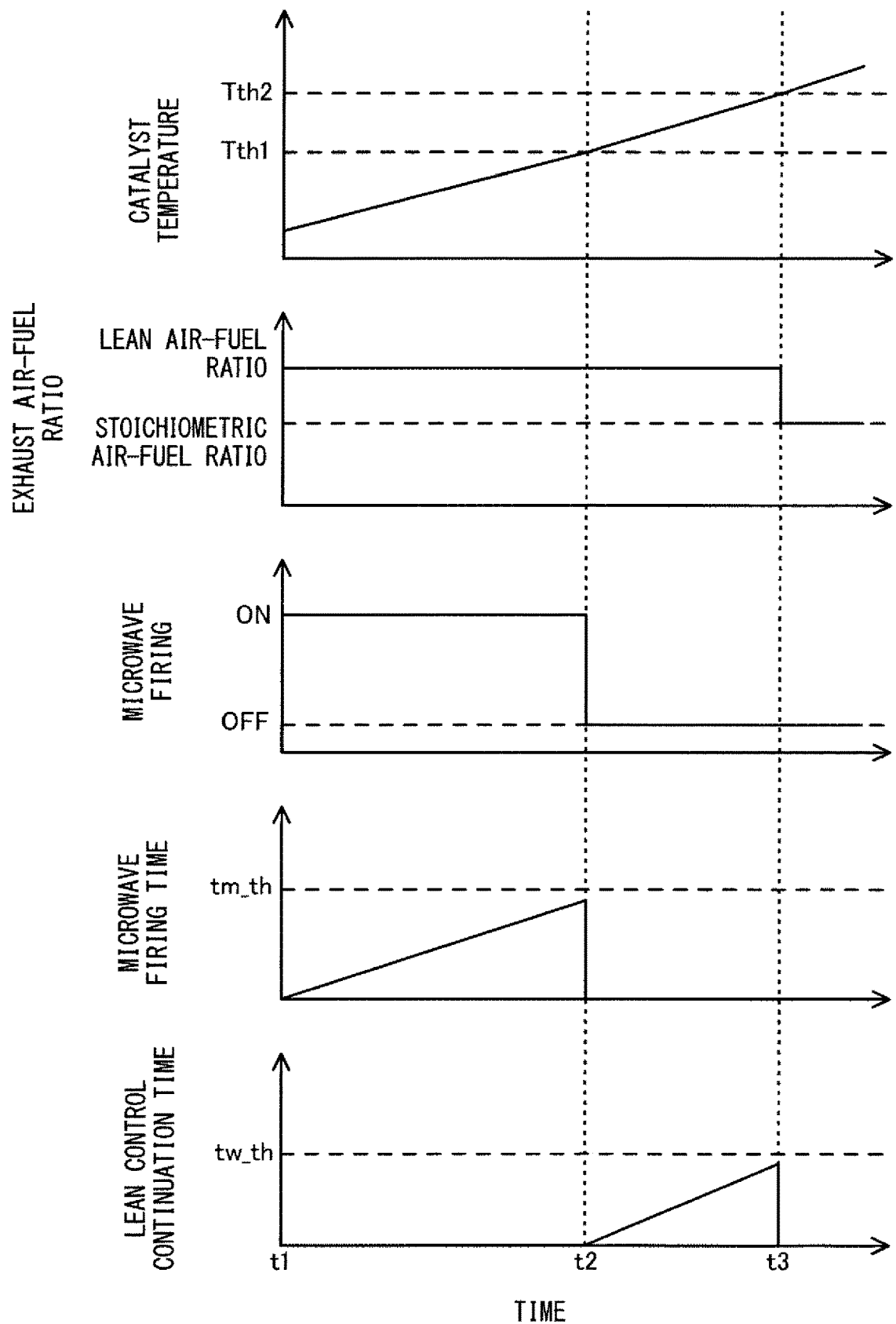
FIG. 7 is a time chart explaining operation of catalyst warmup control according to the first embodiment of the present disclosure.

FIG. 7 is a time chart for explaining the operation of catalyst warmup control according to the present embodiment.

At the time t1, if for example a starter switch of the vehicle is turned on and startup of the internal combustion engine 100 is requested, catalyst warmup control is started. In the example shown in FIG. 7, the catalyst temperature at the time t1, that is, the initial catalyst temperature Tcat_ini, is less than the first catalyst temperature Tth1, so the first warmup processing is performed. That is, the microwave emitter 35 starts emitting the microwaves, the internal combustion engine 100 is started up, and lean control is started for operating the internal combustion engine 100 so that the exhaust air-fuel ratio becomes a predetermined lean air-fuel ratio for the times of warmup control (for example 15 to 16 or so).

Due to this, at the time t1 and on, the exhaust purification catalyst is heated by receiving the heat of exhaust and the heat emitted by the microwave absorber, so the catalyst temperature rises.

At the time t2, if the current catalyst temperature Tcat reaches the first catalyst temperature Tth1, the microwave emitter 35 stops emitting the microwaves, but at the time t2 or more, the exhaust air-fuel ratio is controlled to the lean air-fuel ratio and the internal combustion engine 100 is operated so as to oxidize the HC by a predetermined purification rate or more, so the heat of reaction when oxidizing the HC is used to make the catalyst temperature still further rise.

At the time t3, if the current catalyst bed temperature Tcat reaches the second catalyst temperature Tth2, the lean control is ended and the first warmup processing is ended. At the time t3 on, the target exhaust air-fuel ratio of the internal combustion engine 100 is basically set to the target exhaust air-fuel ratio for the times of normal operation (in the example shown in FIG. 7, the stoichiometric air-fuel ratio).

The internal combustion engine 100 according to the present embodiment explained above is provided with an engine body 1, a catalytic converter 34 (catalyst device) provided in an exhaust passage of the engine body 1 and having an exhaust purification catalyst with at least an oxidation function and a microwave absorber contained in a catalyst coat layer 342 formed inside a substrate 341, and a microwave emitter 35 for irradiating the catalytic converter 34 with microwaves. Further, an electronic control unit 200 (control device) for controlling the internal combustion engine 100 is configured so that if the temperature of the exhaust purification catalyst is less than a predetermined temperature, when engine startup is requested, the microwave emitter 35 irradiates the catalytic converter 34 with microwaves and operates the engine body 1 so that the air-fuel ratio of the exhaust discharged from the engine body 1 becomes a predetermined lean air-fuel ratio leaner than the stoichiometric air-fuel ratio. In the present embodiment, the predetermined temperature is made the temperature of the exhaust purification catalyst at which a predetermined exhaust purification performance is obtained in the catalytic converter 34 when operating the engine body 1 so that the exhaust air-fuel ratio becomes a lean air-fuel ratio, that is, the first catalyst temperature Tth1.

Due to this, when the temperature of the exhaust purification catalyst is less than a predetermined temperature (first catalyst temperature Tth1), both the heat of exhaust and the heat generated by the microwave absorber can be used to heat the exhaust purification catalyst. At this time, in the present embodiment, it is possible to make the microwave absorber contained in the catalyst coat layer 342 generate heat and directly heat the exhaust purification catalyst contained in the catalyst coat layer 342, so the exhaust purification catalyst can be efficiently heated and as a result the rate of rise of temperature of the exhaust purification catalyst can be raised.

Further, by operating the engine body 1 so that the exhaust air-fuel ratio becomes the lean air-fuel ratio, compared with when operating the engine body 1 so that the exhaust air-fuel ratio becomes the stoichiometric air-fuel ratio or rich air-fuel ratio, it is possible to lower the temperature of the exhaust purification catalyst at which a predetermined exhaust purification performance is obtained at the catalytic converter 34.

That is, according to the present embodiment, it is possible to increase the rate of rise of temperature of the exhaust purification catalyst while lowering the temperature of the exhaust purification catalyst at which a predetermined exhaust purification performance is obtained at the catalytic converter 34, so it is possible to reduce the exhaust emission and possible to shorten the time the microwave emitter 35 must be driven for heating the exhaust purification catalyst. For this reason, it is possible to keep down the electric power consumed when driving the microwave emitter 35 and keep the fuel efficiency from deteriorating.

Further, the electronic control unit 200 according to the present embodiment is configured so as to make the microwave emitter 35 stop emitting the microwaves when the temperature of the exhaust purification catalyst becomes a predetermined temperature (first catalyst temperature Tth1) or more. Further, it is configured to operate the engine body 1 so that the exhaust air-fuel ratio becomes the stoichiometric air-fuel ratio when the temperature of the exhaust purification catalyst is a temperature higher than a predetermined temperature (first catalyst temperature Tth1) and a temperature where a predetermined exhaust purification performance is obtained at the catalytic converter 34 when operating the engine body 1 so that the exhaust air-fuel ratio becomes the stoichiometric air-fuel ratio (that is, second catalyst temperature Tth2) or more.

In this way, it is possible to make the microwave emitter 35 stop emitting the microwaves at the point of time when the temperature of the exhaust purification catalyst becomes a temperature where a predetermined exhaust purification performance is obtained at the catalytic converter 34 and thereby reduce the exhaust emission while keeping the amount of electric power consumed when driving the microwave emitter 35 to a minimum.

Further, even after the temperature of the exhaust purification catalyst becomes the predetermined temperature (first catalyst temperature Tth1) or more, it is possible to control the exhaust air-fuel ratio to a lean air-fuel ratio to operate the engine body 1 and thereby oxidize the HC in the exhaust at the catalytic converter 34, so it is possible to use the heat of reaction at that time to raise the catalyst temperature to the second catalyst temperature Tth2. Further, after the catalyst temperature becomes the second catalyst temperature Tth2 or more, it is possible to operate the engine body 1 so that the exhaust air-fuel ratio becomes the stoichiometric air-fuel ratio to thereby secure combustion stability and the output performance at the high load region.

Note that, in the present embodiment, as mentioned above, the predetermined temperature was made the first catalyst temperature Tth1, but when making the predetermined temperature the second catalyst temperature Tth2 and the temperature of the exhaust purification catalyst is less than the second catalyst temperature Tth2, if engine startup is requested, it is also possible to make the microwave emitter 35 irradiate the catalytic converter 34 with microwaves and operate the engine body 1 so that the air-fuel ratio of the exhaust discharged from the engine body 1 becomes a predetermined lean air-fuel ratio leaner than the stoichiometric air-fuel ratio. Further, when the temperature of the exhaust purification catalyst becomes the second catalyst temperature Tth2 or more, it is also possible to make the microwave emitter 35 stop emitting the microwaves and operate the engine body 1 so that the exhaust air-fuel ratio becomes the stoichiometric air-fuel ratio.

In this way, even if the temperature of the exhaust purification catalyst becomes the first catalyst temperature Tth1 or more, it is possible to continue the emission of the microwaves until it becomes the second catalyst temperature Tth2 or more to thereby make the temperature of the exhaust purification catalyst rise to the second catalyst temperature Tth2 earlier compared with when stopping the emission of the microwaves at the point of time when the temperature of the exhaust purification catalyst becomes the first catalyst temperature Tth1 or more.

Second Embodiment

Next, a second embodiment of the present disclosure will be explained. The present embodiment differs from the first embodiment on the point of mounting the internal combustion engine 100 in a hybrid vehicle and driving the microwave emitter 35 while running in an EV mode to warm up the catalytic converter 34. Below, this point of difference will be focused on in the explanation.

Figure 8:
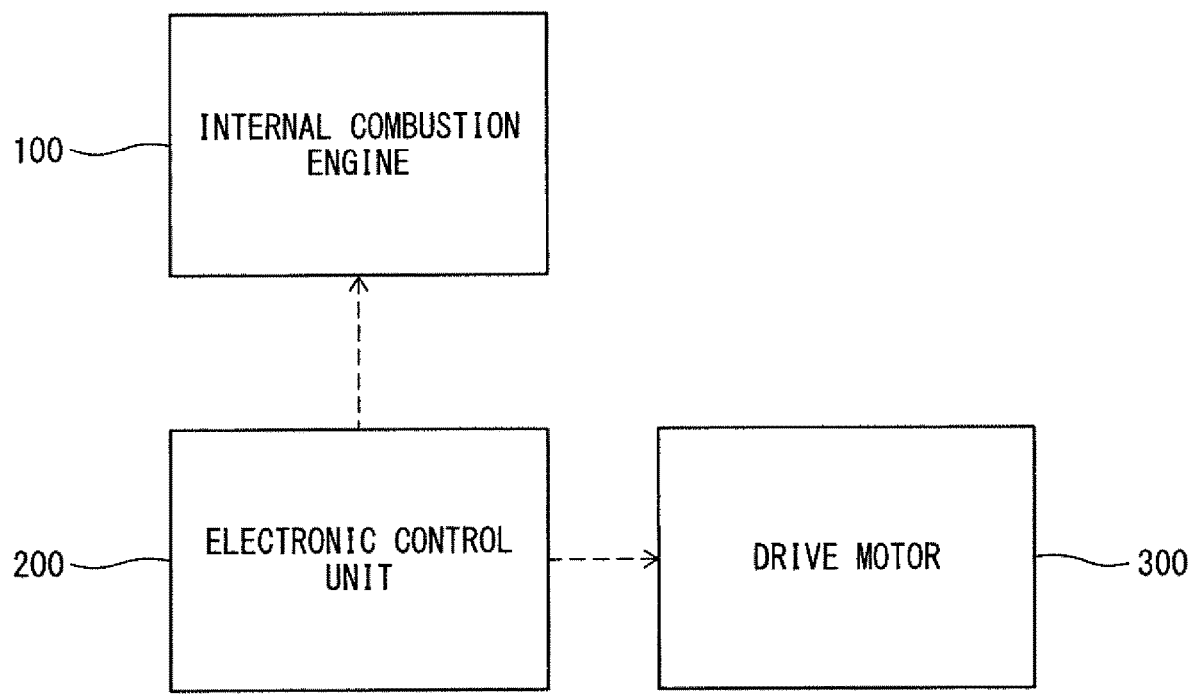
FIG. 8 is a schematic view of the system of a vehicle according to a second embodiment of the present disclosure.

FIG. 8 is a schematic system diagram of a vehicle according to the present embodiment.

The vehicle according to the present embodiment is a hybrid vehicle which is provided with vehicle drive sources constituted by an internal combustion engine 100 and an electric motor 300 and with an electronic control unit 200 for controlling the internal combustion engine 100 and the electric motor 300 and which is configured so as to enable the vehicle to be driven by the drive power of one or both of the internal combustion engine 100 and the electric motor 300. The internal combustion engine 100 and the electronic control unit 200 are configured similar to the first embodiment.

In the case of such a hybrid vehicle, it is possible to run in the EV mode driving the vehicle basically by only the drive power of the electric motor 300 after vehicle startup and warm up the catalytic converter 34 while running in the EV mode so as to reduce the exhaust emission when it is later necessary to start up the internal combustion engine 100. Therefore, in the present embodiment, the microwave emitter 35 is driven while running in the EV mode to warm up the catalytic converter 34. Below, catalyst warmup control according to the present embodiment will be explained.

Figure 9:
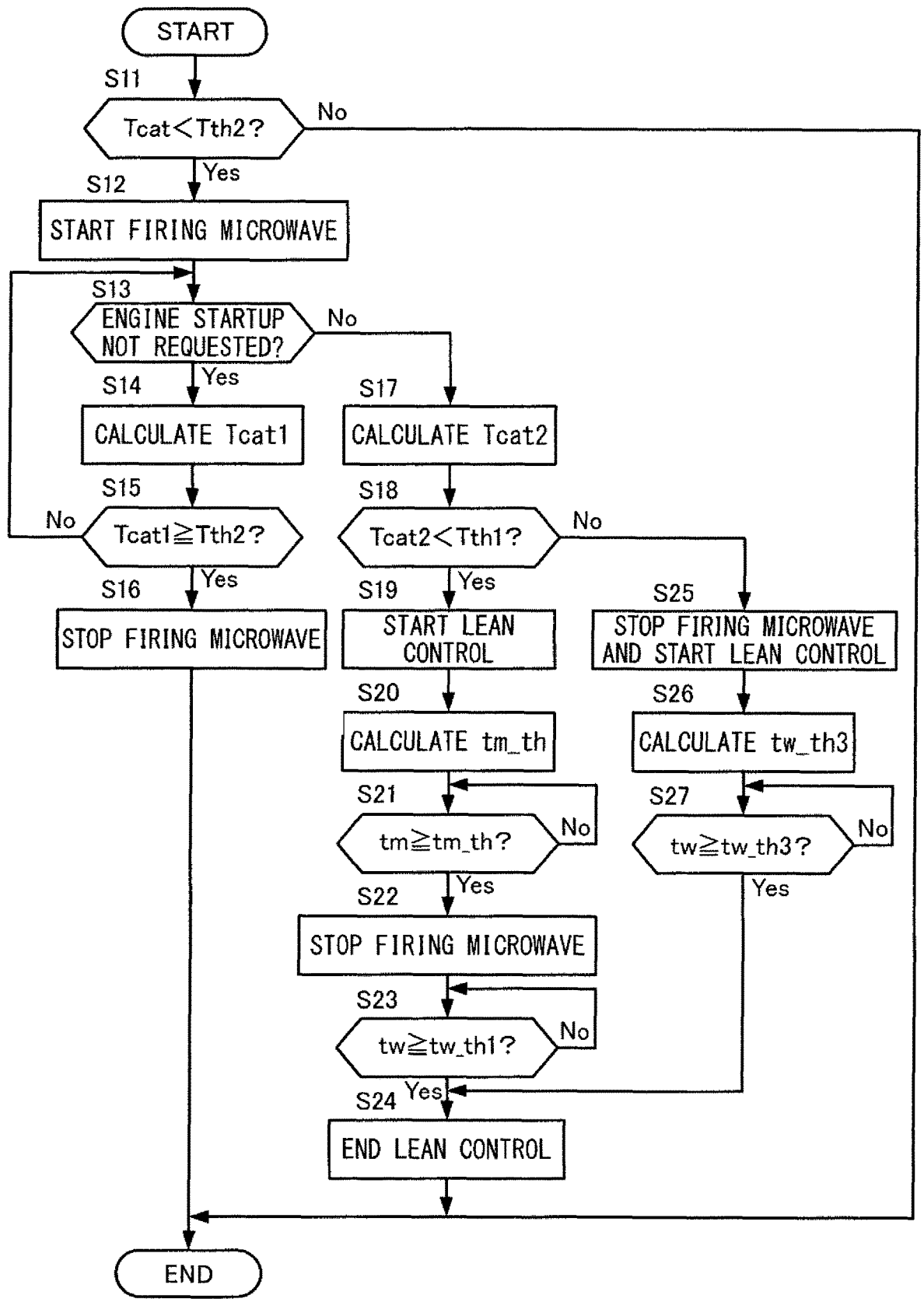
FIG. 9 is a flow chart explaining catalyst warmup control according to the second embodiment of the present disclosure.

FIG. 9 is a flow chart for explaining catalyst warmup control according to the present embodiment.

At step S11, the electronic control unit 200 judges if the current catalyst temperature Tcat while running in the EV mode is less than the second catalyst temperature Tth2. If the current catalyst temperature Tcat is less than the second catalyst temperature Tth2, the electronic control unit 200 proceeds to the processing of step S12. On the other hand, if the current catalyst temperature Tcat is the second catalyst temperature Tth2 or more, the electronic control unit 200 judges that catalyst warmup is unnecessary and ends the catalyst warmup control.

Note that, the current catalyst temperature Tcat at the time of start of running in the EV mode (time of vehicle startup), in the same way as the first embodiment, can be calculated based on the catalyst temperature (stopping catalyst temperature) Tcats when stopping the internal combustion engine 100 the previous time, the time elapsed from when stopping the internal combustion engine 100 the previous time (engine stop time period), and the outside air temperature To. Further, the electronic control unit 200 proceeds to the processing of the later explained step S16 where the current catalyst temperature Tcat after stopping emission of the microwaves can be calculated based on the current catalyst temperature Tcat (corresponding to the second catalyst temperature Th2) when stopping the emission of the microwaves at step S16, the time elapsed from when stopping the emission of the microwaves, and the outside air temperature To.

At step S12, the electronic control unit 200 makes the microwave emitter 35 start emitting the microwaves.

At step S13, the electronic control unit 200 judges if engine startup is requested. If engine startup is not requested, the electronic control unit 200 proceeds to the processing of step S14. On the other hand, if engine startup is requested, the electronic control unit 200 proceeds to the processing of step S17. In the present embodiment, the electronic control unit 200, for example, judges that engine startup is requested when the amount of battery charge of the vehicular battery (not shown) becomes less than a predetermined amount of charge or when the drive power of the vehicle becomes a predetermined drive power or more.

At step S14, the electronic control unit 200 calculates the catalyst temperature Tcat1 while emitting the microwaves. In the present embodiment, the electronic control unit 200 refers to a map prepared in advance by experiments etc. and calculates the catalyst temperature Tcat1 while emitting the microwaves based on the catalyst temperature when starting to emit the microwaves and the microwave emission time tm.

At step S15, the electronic control unit 200 judges if the catalyst temperature Tcat1 while emitting the microwaves is the second catalyst temperature Tth2 or more. If the catalyst temperature Tcat1 while emitting the microwaves is the second catalyst temperature Tth2 or more, the electronic control unit 200 proceeds to the processing of step S16. On the other hand, if the current catalyst temperature Tcat while emitting the microwaves is less than the second catalyst temperature Tth2, the electronic control unit 200 returns to the processing of step S13 after waiting for a certain time.

At step S16, the electronic control unit 200 makes the microwave emitter 35 stop emitting the microwaves once and resumes the processing according to the present routine after waiting for a certain time.

At step S17, the electronic control unit 200 calculates the catalyst temperature Tcat2 when engine startup is requested. When engine startup is requested while emitting microwaves and the electronic control unit 200 proceeds to step S17, the electronic control unit 200 calculates the catalyst temperature Tcat1 while emitting the microwaves as the catalyst temperature Tcat2 when an engine startup is requested. On the other hand, when not emitting microwaves and proceeding to step S17, the electronic control unit 200 calculates the current catalyst temperature Tcat while running in the EV mode at step S11 as the catalyst temperature Tcat2 when an engine startup is requested.

At step S18, the electronic control unit 200 judges if the catalyst temperature Tcat2 when an engine startup is requested is less than the first catalyst temperature Tth1. When the catalyst temperature Tcat2 when an engine startup is requested is less than the first catalyst temperature Tth1, the electronic control unit 200 proceeds to the processing of step S19. On the other hand, if the catalyst temperature Tcat2 when an engine startup is requested is the first catalyst temperature Tth1 or more, the electronic control unit 200 proceeds to the processing of step S25.

At step S19, the electronic control unit 200 continues emitting the microwaves while making the internal combustion engine 100 start up and starts lean control for operating the internal combustion engine 100 so that the exhaust air-fuel ratio becomes a predetermined lean air-fuel ratio for times of warmup control (for example 15 to 16 or so).

At step S20, the electronic control unit 200 calculates the microwave maximum emission time tm_th based on the catalyst temperature Tcat2 when an engine startup is requested. The microwave maximum emission time tm_th in the present embodiment is the time after which it can be deemed that the catalyst temperature has reached the first catalyst temperature Tth1 from the state of the catalyst temperature of Tcat2 when emitting microwaves while performing lean control.

At step S21, the electronic control unit 200 judges if the microwave emission time tm is the microwave maximum emission time tm_th or more. If the microwave emission time tm is the microwave maximum emission time tm_th or more, the electronic control unit 200 proceeds to the processing of step S22. On the other hand, if the microwave emission time tm is less than the microwave maximum emission time tm_th, the electronic control unit 200 again performs the processing of step S21 after waiting for a certain time.

At step S22, the electronic control unit 200 makes the microwave emitter 35 stop emitting the microwaves.

At step S23, the electronic control unit 200 judges if the lean control continuation time tw from when making the microwave emitter 35 stop emitting the microwaves has become the first lean control maximum continuation time tw_th1 or more. The first lean control maximum continuation time tw_th1, like in the first embodiment, is the time after which it can be deemed that the catalyst temperature has reached the second catalyst temperature Tth2 when operating the internal combustion engine 100 so that the exhaust air-fuel ratio becomes a lean air-fuel ratio without making the microwave emitter 35 emit microwaves after raising the catalyst temperature to the first catalyst temperature Tth1.

If the lean control continuation time tw is the first lean control maximum continuation time tw_th1 or more, the electronic control unit 200 proceeds to the processing of step S24. On the other hand, if the lean control continuation time tw is less than the first lean control maximum continuation time tw_th1, the electronic control unit 200 again performs the processing of step S23 after waiting for a certain time.

At step S24, the electronic control unit 200 ends the lean control, sets the target exhaust air-fuel ratio of the internal combustion engine 100 to the target exhaust air-fuel ratio for the times of normal operation (basically, the stoichiometric air-fuel ratio), and ends the catalyst warmup control.

At step S25, the electronic control unit 200 stops the emission of the microwaves, starts up the internal combustion engine 100, and starts lean control operating the internal combustion engine 100 so that the exhaust air-fuel ratio becomes a predetermined lean air-fuel ratio for the time of warmup control (for example, 15 to 16 or so).

At step S26, the electronic control unit 200 calculates an upper limit value tw_th3 of the time of continuation of the lean control (below, referred to as the "third lean control maximum continuation time") based on the catalyst temperature Tcat2 when the engine startup is requested.

The third lean control maximum continuation time tw_th3 is the time after which it can be deemed that the catalyst temperature has reached the second catalyst temperature Tth2 when operating the internal combustion engine 100 so that the exhaust air-fuel ratio becomes the lean air-fuel ratio without making the microwave emitter 35 emit microwaves from the state of the catalyst temperature Tcat2. The third lean control maximum continuation time tw_th3 becomes shorter the higher the catalyst temperature Tcat2 when an engine startup is requested.

At step S27, the electronic control unit 200 judges if the lean control continuation time tw from when the microwave emitter 35 stops emitting the microwaves is a third lean control maximum continuation time tw_th3 or more. If the lean control continuation time tw is the third lean control maximum continuation time tw_th3 or more, the electronic control unit 200 proceeds to the processing of step S24. On the other hand, if the lean control continuation time tw is less than the third lean control maximum continuation time tw_th3, the electronic control unit 200 again performs the processing of step S27 after waiting for a certain time.

Figure 10:
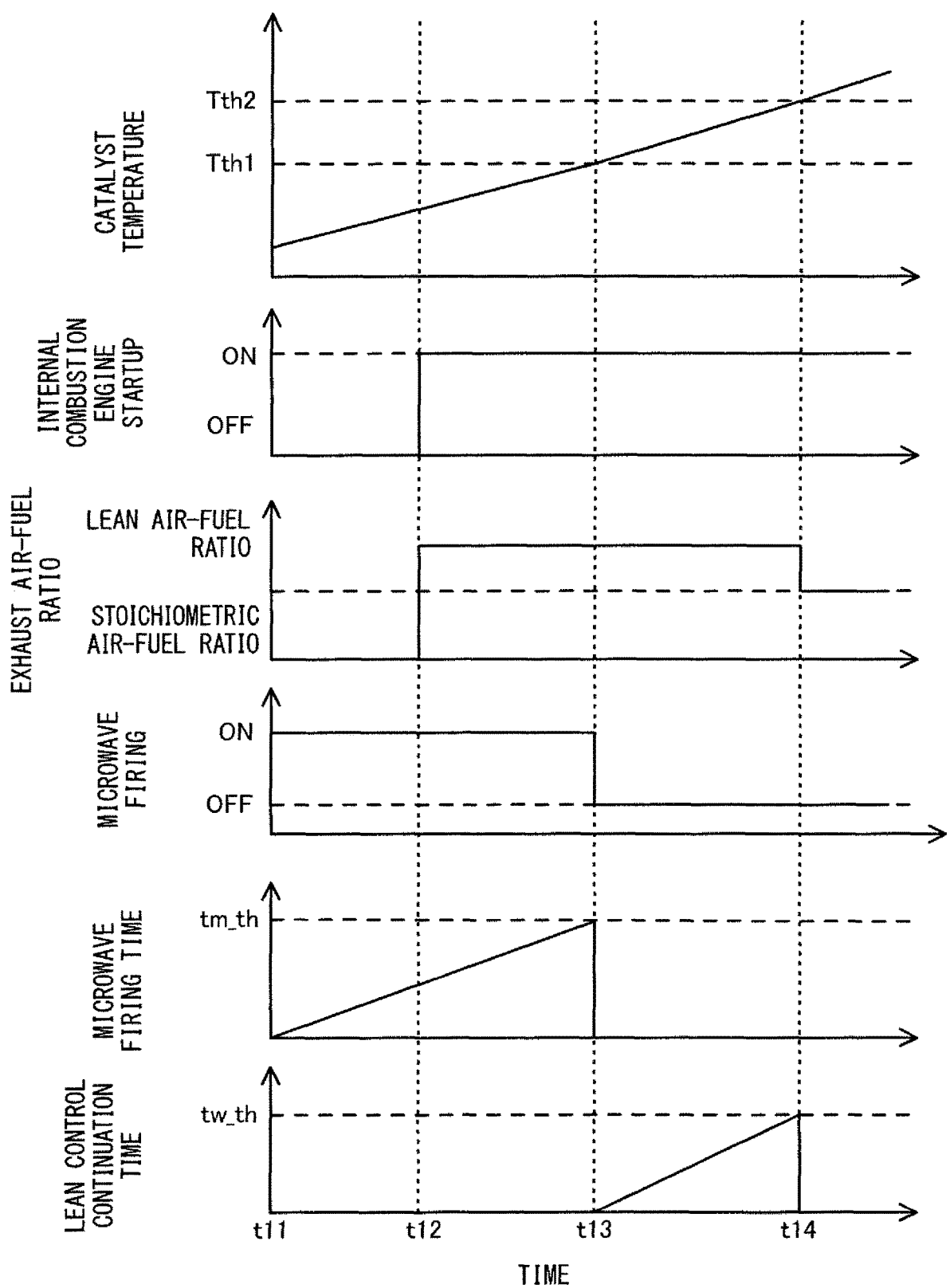
FIG. 10 is a time chart explaining operation of catalyst warmup control according to the second embodiment of the present disclosure.

FIG. 10 is a time chart for explaining the operation of catalyst warmup control according to the present embodiment.

At the time t11, if the vehicle start switch is turned on, catalyst warmup control is started. In the example shown in FIG. 10, engine startup is not requested at the time t11, so while the internal combustion engine 100 is left stopped, the drive power of the electric motor 300 is used to start the EV mode. Since the catalyst temperature at the time t11, that is, the current catalyst temperature Tcat during the EV mode is less than the second catalyst temperature Tth2, the microwave emitter 35 starts emitting the microwaves.

At the time t12, if an engine startup is requested while emitting microwaves, it is judged if the catalyst temperature Tcat2 when the engine startup was requested is less than the first catalyst temperature Tth1. In the example shown in FIG. 10, the catalyst temperature Tcat2 when the engine startup is requested is less than the first catalyst temperature Tth1, so the microwaves continue to be emitted while the internal combustion engine is started up and lean control is started.

At the time t13, if the microwave emission time tm becomes the microwave maximum emission time tm_th or more, it is judged that the catalyst temperature has reached the first catalyst temperature Tth1 and the microwaves stop being emitted. Further, at the time t14, if the lean control continuation time tw becomes the first lean control maximum continuation time tw_th1 or more, it is judged that the catalyst temperature has reached the second catalyst temperature Tth2 and the lean control is ended.

According to the present embodiment explained above, the electronic control unit 200 is configured so that when the temperature of the exhaust purification catalyst is less than a second catalyst temperature Tth2 (that is, a temperature where a predetermined exhaust purification performance is obtained at the catalytic converter 34 when operating the engine body 1 so that the exhaust air-fuel ratio becomes the stoichiometric air-fuel ratio) during driving by the drive power of the electric motor 300 before engine startup is requested, it makes the microwave emitter 35 irradiate the catalytic converter 34 (catalyst device) with microwaves.

Due to this, it is possible to warm up the catalytic converter 34 before starting up the internal combustion engine 100, so it is possible to reduce the exhaust emission when it subsequently becomes necessary to start up the internal combustion engine 100.

Third Embodiment

Next, a third embodiment of the present disclosure will be explained. The present embodiment differs from the first embodiment on the point of predicting a delay time until the internal combustion engine 100 is started up and making the microwave emitter 35 start emitting the microwaves when the delay time becomes less than a predetermined time. Below, this point of difference will be focused on in the explanation.

Figure 11:
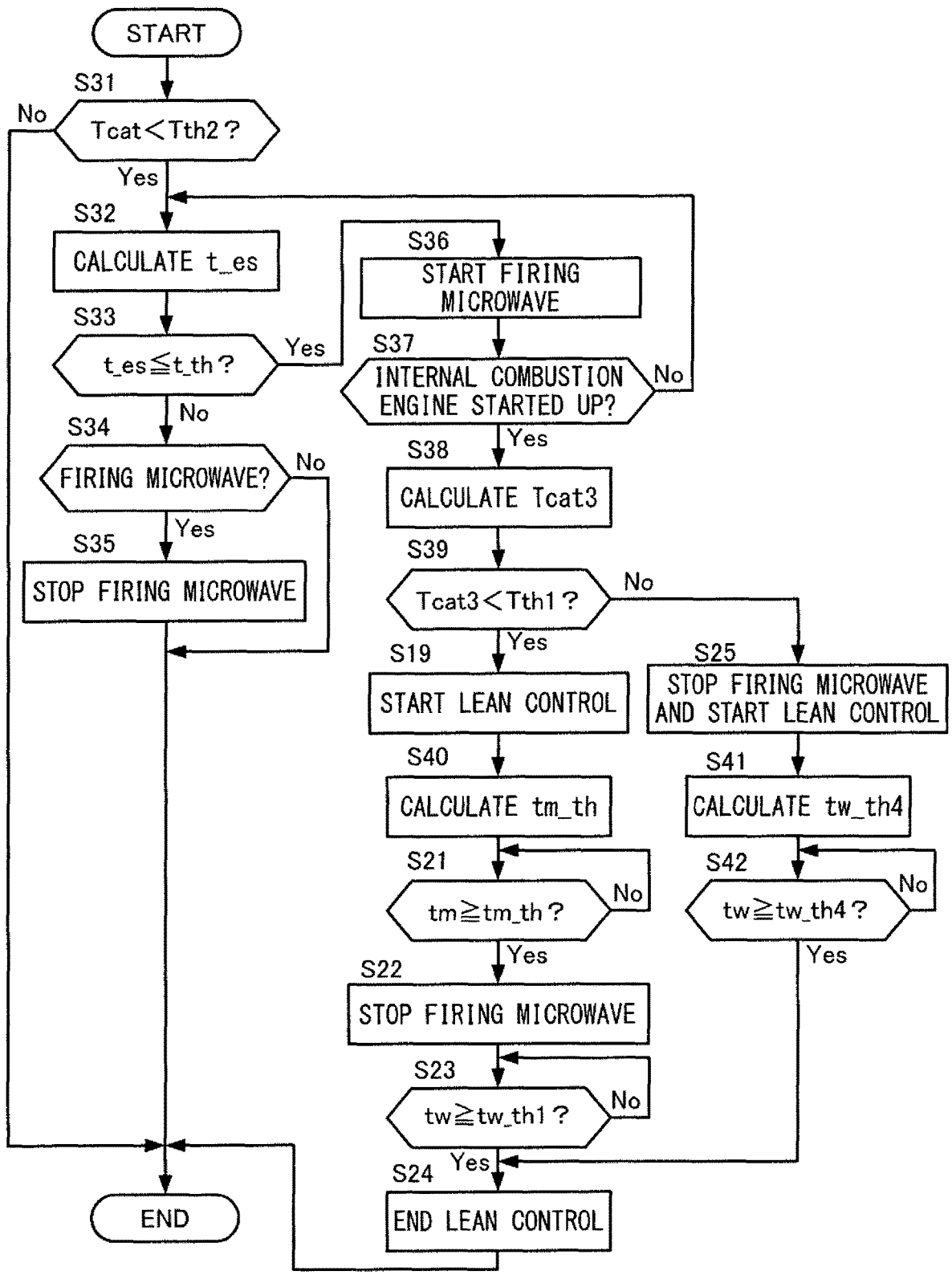
FIG. 11 is a flow chart explaining catalyst warmup control according to a third embodiment of the present disclosure.

FIG. 11 is a flow chart for explaining the catalyst warmup control according to the present embodiment. Note that, in the flow chart of FIG. 11, the processing of step S19 and step S21 to step S25 is similar to the above-mentioned second embodiment, so explanations will be omitted here.

At step S31, the electronic control unit 200 judges if the current catalyst temperature Tcat is less than the second catalyst temperature Tth2. If the current catalyst temperature Tcat is less than the second catalyst temperature Tth2, the electronic control unit 200 proceeds to the processing of step S32. On the other hand, if the current catalyst temperature Tcat is the second catalyst temperature Tth2 or more, the electronic control unit 200 judges that warmup of the catalyst is unnecessary and ends the catalyst warmup control.

At step S32, the electronic control unit 200 calculates the time interval from the current time to the time when the internal combustion engine 100 is expected to be started up as the delay time t_es until the internal combustion engine 100 is started up.

The delay time t_es becomes a certain set time such as the time from when a door of a vehicle is opened to when the internal combustion engine 100 is started up or the time from when a driver sits in a driver's seat of a vehicle to when the internal combustion engine 100 is started up, so, for example, can be calculated by detecting when a door of the vehicle is opened or when the driver sits in the driver's seat of the vehicle. Further, if the electronic control unit 200 is configured to be able to communicate with an external cloud server, it is possible to acquire data on the past driving information of the host vehicle collected in the cloud server and calculate the delay time t_es from that driving information. Further, if the internal combustion engine 100 is mounted in a hybrid vehicle, it is possible to calculate the delay time t_es by predicting the driving load from the driving information of the host vehicle and other vehicles, map information, etc. collected in the cloud server.

At step S33, the electronic control unit 200 judges if the delay time t_es is the warmup start judgment threshold value t_th or less. The warmup start judgment threshold value t_th is a value corresponding to the time required for raising the catalyst temperature to the second catalyst temperature Tth2 after making the microwave emitter 35 start to emit the microwaves.

Therefore, when the delay time t_es is the warmup start judgment threshold value t_th or less, it is desirable to start emitting the microwaves to start warmup of the catalyst and to warm up the catalyst before the internal combustion engine 100 is expected to be started up. Therefore, in the present embodiment, when the delay time t_es is the warmup start judgment threshold value t_th or less, the electronic control unit 200 proceeds to the processing of step S36 on where the microwave starts to be emitted.

On the other hand, when the delay time t_es is larger than the warmup start judgment threshold value t_th, if there is still a margin of time until catalyst warmup, if starting to emit the microwaves from this point of time, electric power is liable to be unnecessarily wasted. Therefore, in the present embodiment, when the delay time t_es becomes larger than the warmup start judgment threshold value t_th, the electronic control unit 200 proceeds to the processing of step S34 on. Until the delay time t_es becomes less than the warmup start judgment threshold value t_th, the electronic control unit 200 stands by without emitting microwaves (that is, warming up the catalyst).

Note that whether microwaves are being emitted is judged at step S34 and, if microwaves are being emitted, the microwaves stop being emitted at step S35 for the following reason. That is, when the delay time t_es becomes the warmup start judgment threshold value t_th or less, the electronic control unit 200 proceeds once to step S36, where the microwaves starts to be emitted. After that, the electronic control unit 200 returns from step S37 to step S32 where the delay time t_es is newly calculated. At this time, sometimes the delay time t_es changes in a direction becoming longer. As a result, sometimes the delay time t_es becomes greater than the warmup start judgment threshold value t_th.

At step S36, the electronic control unit 200 makes the microwave emitter 35 start emitting the microwaves.

At step S37, the electronic control unit 200 judges if the internal combustion engine 100 has actually been started up. In the present embodiment, the electronic control unit 200 judges that the internal combustion engine 100 has been started up when the engine rotational speed becomes a predetermined rotational speed or more. The electronic control unit 200 proceeds to the processing of step S38 when the internal combustion engine 100 has actually been started up. On the other hand, the electronic control unit 200 returns to the processing of step S32 after waiting for a certain time and newly calculates the delay time t_es if the internal combustion engine 100 has still not been started up.

At step S38, the electronic control unit 200 calculates the catalyst temperature Tcat3 for when the internal combustion engine 100 has actually been started up. In the present embodiment, the electronic control unit 200 calculates the catalyst temperature Tcat3 for when the internal combustion engine 100 has actually been started up based on the elapsed time (microwave emission time) tm from when starting emitting the microwaves at step S36.

At step S39, the electronic control unit 200 judges if the catalyst temperature Tcat3 for when the internal combustion engine 100 has actually been started up is less than the first catalyst temperature Tth1. If the catalyst temperature Tcat3 for when the internal combustion engine 100 has actually been started up is less than the first catalyst temperature Tth1, the electronic control unit 200 proceeds to the processing of step S19. On the other hand, if the catalyst temperature Tcat3 for when the internal combustion engine 100 has actually been started up is the first catalyst temperature Tth1 or more, the electronic control unit 200 proceeds to the processing of step S25.

At step S40, the electronic control unit 200 calculates the microwave maximum emission time tm_th based on the catalyst temperature Tcat3 when the internal combustion engine 100 is actually started up. The microwave maximum emission time tm_th in the present embodiment is the time after which it can be deemed that the catalyst temperature has reached the first catalyst temperature Tth1 when emitting the microwaves from the state of a catalyst temperature Tcat3 while performing lean control. It is made shorter the higher the catalyst temperature Tcat3 when the internal combustion engine 100 is actually started up.

At step S41, the electronic control unit 200 calculates the upper limit value of the time of continuation of lean control (below, referred to as the "fourth lean control maximum continuation time") tw_th4 based on the catalyst temperature Tcat3 when the internal combustion engine 100 is actually started up.

The fourth lean control maximum continuation time tw_th4 is the time after which it can be deemed that the catalyst temperature has reached the second catalyst temperature Tth2 when operating the internal combustion engine 100 so that the exhaust air-fuel ratio becomes the lean air-fuel ratio without having the microwave emitter 35 emit microwaves from the state of the catalyst temperature Tcat3. The fourth lean control maximum continuation time tw_th4 becomes shorter the higher the current catalyst temperature Tcat3 when the internal combustion engine 100 has actually been started up.

At step S42, the electronic control unit 200 judges if the lean control continuation time tw from when the microwave emitter 35 stopped emitting the microwaves is a fourth lean control maximum continuation time tw_th4 or more. The electronic control unit 200 proceeds to the processing of step S24 if the lean control continuation time tw is the fourth lean control maximum continuation time tw_th4 or more. On the other hand, the electronic control unit 200 again performs the processing of step S42 after waiting a certain time if the lean control continuation time tw is less than the fourth lean control maximum continuation time tw_th4.

According to the present embodiment explained above, the electronic control unit 200 is configured to calculate a delay time t_es until the engine startup is requested and to make the microwave emitter 35 irradiate the catalytic converter 34 (catalyst device) with microwaves when the delay time t_es is a predetermined time or less. Further, the predetermined time is made the time after which the temperature of the exhaust purification catalyst can be raised to a temperature at which a predetermined exhaust purification performance is obtained at the catalytic converter 34 when operating the engine body 1 so that the exhaust air-fuel ratio becomes the stoichiometric air-fuel ratio in the case of making the microwave emitter 35 irradiate the catalytic converter 34 with microwaves without operating the engine body 1.

Due to this, it is possible to emit microwaves so that the catalytic converter 34 finishes being warmed up matching the timing at which the internal combustion engine 100 is expected to be started up, so it is possible to reduce the exhaust emission while keeping down the amount of electric power consumed when driving the microwave emitter 35.

Above, embodiments of the present disclosure were explained, but the above embodiments only show some of the examples of application of the present disclosure and are not meant to limit the technical scope of the present disclosure to the specific constitutions of the above embodiments.

For example, in the above embodiments, the engine body 1 was operated so that the exhaust air-fuel ratio became the lean air-fuel ratio at the time of startup of the internal combustion engine, but to secure stability of combustion right after engine startup, it is also possible to operate the engine body 1 so that right after startup, the exhaust air-fuel ratio becomes a rich air-fuel ratio and then control it to a lean air-fuel ratio.

Further, if combining the catalyst warmup control explained in the third embodiment with the catalyst warmup control explained in the second embodiment, it is also possible to not have the microwave emitter 35 emit microwaves when the delay time t_es is greater than the warmup start judgment threshold value t_th (predetermined time) even if the temperature of the exhaust purification catalyst is less than the second catalyst temperature Tth2 during the EV mode.

The invention claimed is:

1. A control device for an internal combustion engine, the internal combustion engine comprising:
    an engine body;
    a catalyst device which is provided in an exhaust passage of the engine body and has an exhaust purification catalyst with at least an oxidation function and a microwave absorber contained in a catalyst coat layer formed inside a substrate; and
    a microwave emitter for irradiating the catalyst device with microwaves, the control device comprising:
    a processor that is configured to, in response to an engine startup request when a temperature of the exhaust purification catalyst is less than a predetermined temperature, cause
    the microwave emitter to irradiate the catalyst device with microwaves and operate the engine body so that an air-fuel ratio of exhaust discharged from the engine body changes from a stoichiometric air-fuel ratio to a predetermined lean air-fuel ratio leaner than the stoichiometric air-fuel ratio,
    wherein the predetermined temperature is a temperature at which a predetermined exhaust purification performance is obtained at the catalyst device when operating the engine body so that the air-fuel ratio of the exhaust becomes the lean air-fuel ratio, and
    the processor is further configured to operate the engine body so that the air-fuel ratio of the exhaust becomes the stoichiometric air-fuel ratio when the temperature of the exhaust purification catalyst becomes a temperature that is (a) higher than the predetermined temperature and (b) a temperature where a predetermined exhaust purification performance is obtained at the catalyst device when operating the engine body so that the air-fuel ratio of the exhaust is the stoichiometric air-fuel ratio.

2. The control device for the internal combustion engine according to claim 1, wherein
    the processor is further configured so as to make the microwave emitter stop emitting microwaves when the temperature of the exhaust purification catalyst becomes the predetermined temperature or more.

3. The control device for the internal combustion engine according to claim 1, wherein
    the microwave absorber is arranged near the exhaust purification catalyst having the oxidation function inside the catalyst coat layer.

4. The control device for the internal combustion engine according to claim 1, wherein
    the internal combustion includes an electric motor,
    the internal combustion engine is mounted in a vehicle able to run by drive power of one or both of the internal combustion engine or the electric motor and
    the processor is further configured so that while driving by the drive power of the electric motor before the engine startup is requested, the processor causes the microwave emitter irradiate the catalyst device with microwaves when the temperature of the exhaust purification catalyst is less than the temperature at which a predetermined exhaust purification performance is obtained at the catalyst device when operating the engine body so that the air-fuel ratio of the exhaust becomes the stoichiometric air-fuel ratio.

5. The control device for the internal combustion engine according to claim 4, wherein
    the processor is further configured to:
    calculate a delay time until engine startup is requested;
    make the microwave emitter irradiate the catalyst device with microwaves when the delay time is a predetermined time or less; and, not make the microwave emitter emit microwaves when the delay time is longer than the predetermined time period even if the temperature of the exhaust purification catalyst is less than the temperature at which a predetermined exhaust purification performance is obtained at the catalyst device when operating the engine body so that the air-fuel ratio of the exhaust becomes the stoichiometric air-fuel ratio.

6. A control device for an internal combustion engine, the internal combustion engine comprising:
   an engine body;
   a catalyst device which is provided in an exhaust passage of the engine body and has an exhaust purification catalyst with at least an oxidation function and a microwave absorber contained in a catalyst coat layer formed inside a substrate; and
   a microwave emitter for irradiating the catalyst device with microwaves, the control device comprising:
a processor that is configured to, in response to an engine startup request when a temperature of the exhaust purification catalyst is less than a predetermined temperature, cause the microwave emitter to irradiate the catalyst device with microwaves and operate the engine body so that an air-fuel ratio of exhaust discharged from the engine body changes from a stoichiometric air-fuel ratio to a predetermined lean air-fuel ratio leaner than the stoichiometric air-fuel ratio, wherein,
the predetermined temperature is a temperature at which a predetermined exhaust purification performance is obtained at the catalyst device when operating the engine body so that the air-fuel ratio of the exhaust becomes the stoichiometric air-fuel ratio, and
the processor is further configured to make the microwave emitter stop emitting microwaves and operate the engine body so that the air-fuel ratio of the exhaust becomes the stoichiometric air-fuel ratio when the temperature of the exhaust purification catalyst becomes the predetermined temperature or more.

7. A control device for an internal combustion engine, the internal combustion engine comprising:
   an engine body;
   a catalyst device which is provided in an exhaust passage of the engine body and has an exhaust purification catalyst with at least an oxidation function and a microwave absorber contained in a catalyst coat layer formed inside a substrate; and
   a microwave emitter for irradiating the catalyst device with microwaves, the control device comprising:
a processor that is configured to, in response to an engine startup request when a temperature of the exhaust purification catalyst is less than a predetermined temperature, cause the microwave emitter to irradiate the catalyst device with microwaves and operate the engine body so that an air-fuel ratio of exhaust discharged from the engine body changes from a stoichiometric air-fuel ratio to a predetermined lean air-fuel ratio leaner than the stoichiometric air-fuel ratio, wherein
the processor is further configured to:
   calculate a delay time until an engine startup is requested; and
   make the microwave emitter irradiate the catalyst device with microwaves when the delay time is a predetermined time or less.

8. The control device for the internal combustion engine according to claim 7, wherein
   when the processor causes the microwave emitter to irradiate the catalyst device with microwaves without operating the engine body, the predetermined time is a time period which enables the temperature of the exhaust purification catalyst to be raised to a temperature at which a predetermined exhaust purification performance is obtained at the catalyst device when operating the engine body so that the air-fuel ratio of the exhaust becomes the stoichiometric air-fuel ratio.

* * * * *